Nov. 7, 1950     K. J. BARNES     2,529,126

GROUND FAULT LOCATING DEVICE

Filed Aug. 20, 1947

INVENTOR.
Kenneth J. Barnes
BY
Att'y

Patented Nov. 7, 1950

2,529,126

UNITED STATES PATENT OFFICE 2,529,126

GROUND FAULT LOCATING DEVICE

Kenneth J. Barnes, Richmond, Calif.

Application August 20, 1947, Serial No. 769,646

1 Claim. (Cl. 175—183)

This invention relates to improvements in electrical ground fault testing device.

The principal object of this invention is to provide means for locating a ground fault in a normally ungrounded power circuit in an expeditious manner and without necessity of interrupting any part of the service or opening any switches or circuit breakers in feed lines, or branch lines, until the faulty branch has been positively located.

A further object is to produce a device which may be used either as a permanent installation or may be used as a portable arrangement.

A still further object is to produce a device which is economical to manufacture, simple to use and one which is positive in action, thus eliminating guess work and multiple tests.

Other objects and advantages will be apparent during the course of the following description.

Figure 1:
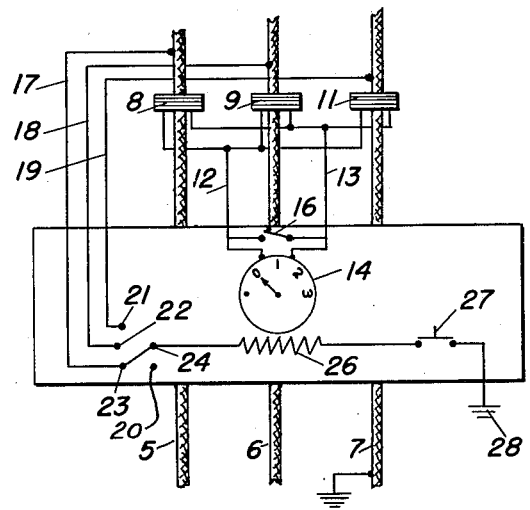

In the accompanying drawings forming a part of this specification and in which like numerals are employed to designate like parts throughout the same, Fig. 1 is a diagrammatic view showing an arrangement of my device for the purpose of an explanation of the theory of and operation of said device.

Figure 2:
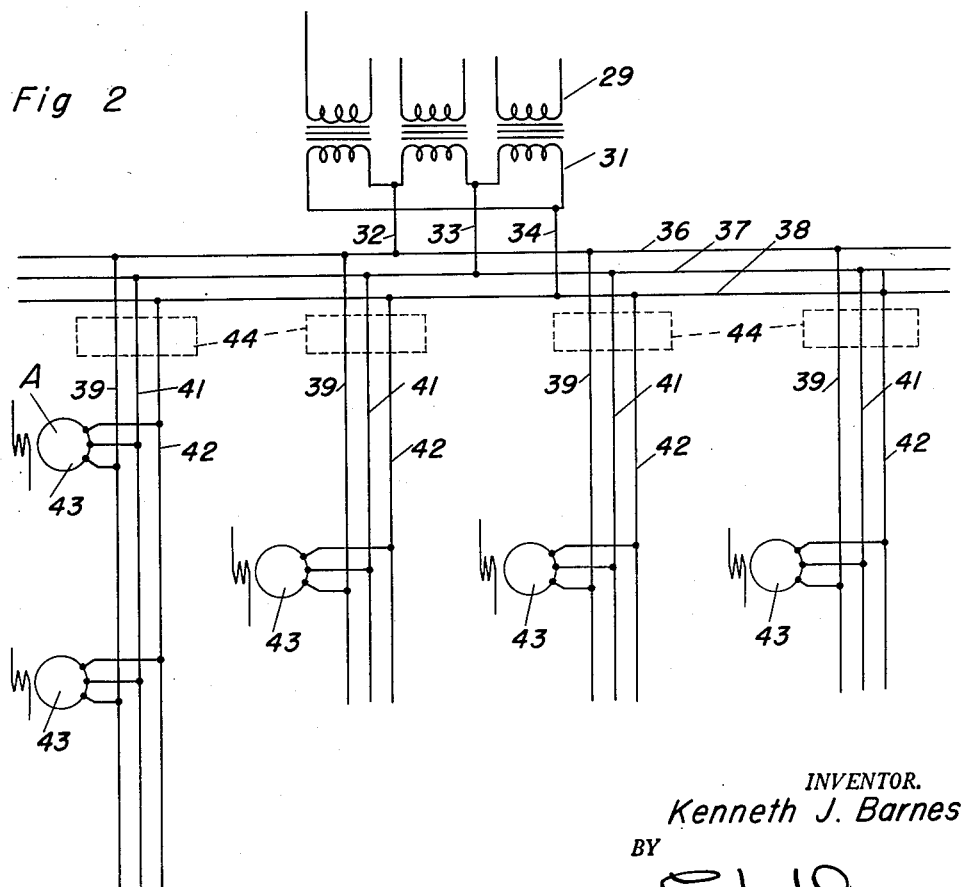

Fig. 2 is a schematic wiring diagram of a three phase circuit having several branches and showing in dotted lines the position which the tester will occupy.

At the present time the method of locating a ground fault in a feeder line is to open the breakers in each of the branches extending from the feeder line, and then to individually test the circuit extending from the branch, as for example, a motor circuit.

Such method interrupts the operation of the motor, thus slowing down production and when there are a large number of loads on the circuit it is merely a matter of chance in selecting the circuit to be tested first; consequently, a large number of tests may be required to be made before the faulty circuit is located.

In the accompanying drawings wherein for the purpose of illustration is shown a preferred embodiment of my invention, the numerals 5, 6 and 7 designate feed wires of a three-phase circuit, which wires are to be tested to find if they are serving a branch circuit on which a ground fault exists.

My device consists of a plurality of coils 8, 9 and 11, which are connected in parallel, each coil inductively encircling one of the feed wires.

These coils are in turn connected by wires 12 and 13 to an adjustable ammeter 14. The adjustable feature is accomplished as is common by a knob (not shown) connected to the ammeter control spring (not shown) to change the tension of the spring. The purpose of this adjustment is to return the pointer to a position on the ammeter scale where its action may be observed. If, for instance, an unbalance of seven amperes should exist, the pointer would be held firmly to one side and the small applied load current otherwise necessary would not deflect the pointer. Any unbalance that may be in the coils is of no concern as long as the pointer is in a free position to move in either direction. The applied load current may increase any existing unbalance, moving the pointer in one direction, or it may decrease the unbalance, moving the pointer in the other direction.

A short circuiting switch is shown at 16 and when closed connects the wires 12 and 13. This is to protect the ammeter in case an extreme unbalance should exist for a long period of time.

The wires 17, 18 and 19 connect the wires 5, 6 and 7 respectively to contacts 23, 22 and 21 of a selector switch 24. A contact 20 being at the off position. The wires 17, 18 and 19 are connected to feed lines 5, 6 and 7 between the coils 8, 9 and 11 and the transformer or source of power.

This selector switch is in turn connected through a resistance 26 to a grounding switch 27, which switch is grounded as shown at 28.

Referring now to Fig. 2, at 29, I have shown the primary of a three-phase transformer and at 31 the secondary thereof.

Wires 32, 33 and 34 extend from the secondary to the wires 36, 37 and 38 respectively, which are the main feeder wires from which a series of branch wires 39, 41 and 42 extend, and to these branch wires three-phase motors 43 are connected.

Now, assuming that the wire 7 in Fig. 1 corresponds to the wire 42 in Fig. 2, and that the motor "A" has developed a ground, making it necessary to locate the same, I connect my device at the position shown in dotted lines at 44 in Fig. 2 either permanently or through the use of a portable arrangement.

To understand my circuit it should first be understood that a ground fault can occur on a three-phase, normally ungrounded, power system without interrupting any operations. With a ground fault existing, it should also be understood that applying a current load to ground from an ungrounded phase, that load current thus applied can enter the system only at the ground fault. This applied load current will take the shortest path from the ground fault to the transformer bank. Referring to Fig. 2 this path will be from motor A to wire 42, along wire 42 to wire 38, along wire 38 to wire 34, and along wire 34 to the transformer.

The first step in making a test is to open the short circuiting switch 16 and to then adjust the ammeter 14 to a position at which its action can be observed.

Now, the selector switch 24 is closed so that it is on the contact 23, which in this instance is an ungrounded phase.

In order for a deflection to occur, there must be a current load applied from an ungrounded phase. Grounding the grounded phase through the resistor 26 would not apply any current load and no deflection of the ammeter would occur.

With the applied current load controlled by resistor 26, the ground switch 27 is then pressed and current load is then connected to ground 28. Referring to Fig. 2, this applied load current will enter the circuit at motor A and take a path along wire 42 and through my device on that feeder, and along wire 38 to wire 34, and along wire 34 to the transformer. With wire 42 in Fig. 2, corresponding to wire 7 in Fig. 1, and with the effect of the existing load neutralized in the coils 8, 9 and 11, and with the ammeter needle adjusted to a position to swing freely, the path of the return applied load current will be along wire 7 and cause an unbalance in coil 11 and will deflect the needle of the ammeter. A deflection of the ammeter positively indicates that this device is in the path of the return applied load current, a direct path from the ground fault to the transformer. In Fig. 2 with one of my devices installed at each of the positions 44, the device on the feeder serving motor A will show a deflection, but there will be no deflection on any of the other three devices, indicating that these feeders are clear of any ground faults. My device will show a deflection anywhere along this path at the time the current load is applied, and at no other place in the system except this path.

My device will not indicate which phase is grounded because the applied load current is taken off the feeder between the neutralizing coils and the source of power or transformers. It must be assumed that the knowledge that a ground fault exists has been determined by ground indicating lamps, voltage tester or other method. My device is for locating that ground fault without interrupting service.

It is to be understood that the form of my invention herewith shown and described is to be taken as a preferred example of the same and that various changes relative to the material, size, shaped and arrangement of parts may be resorted to without departing from the spirit of the invention or the scope of the subjoined claim.

What is claimed is:

A ground fault locating device for use on normally ungrounded alternating current distributing systems and comprising a plurality of neutralizing coils, each inductively connected to a single current conducting lead, said coils being connected in parallel, an indicator conductively connected between the opposite sides of said coils, a selective switch conductively connected to said current-carrying leads between the neutralizing coils and the current source, and a current-controlled grounding means conductively connected to the common lead of said switch.

KENNETH J. BARNES.

REFERENCES CITED

The following references are of record in the file of this patent:

UNITED STATES PATENTS

| Number | Name | Date |
|---|---|---|
| 851,149 | Woodbridge et al. | Apr. 23, 1907 |
| 1,055,018 | Burnham | Mar. 4, 1913 |
| 1,937,166 | Pittman | Nov. 28, 1933 |

FOREIGN PATENTS

| Number | Country | Date |
|---|---|---|
| 102,621 | Great Britain | July 12, 1917 |